Figure 1:
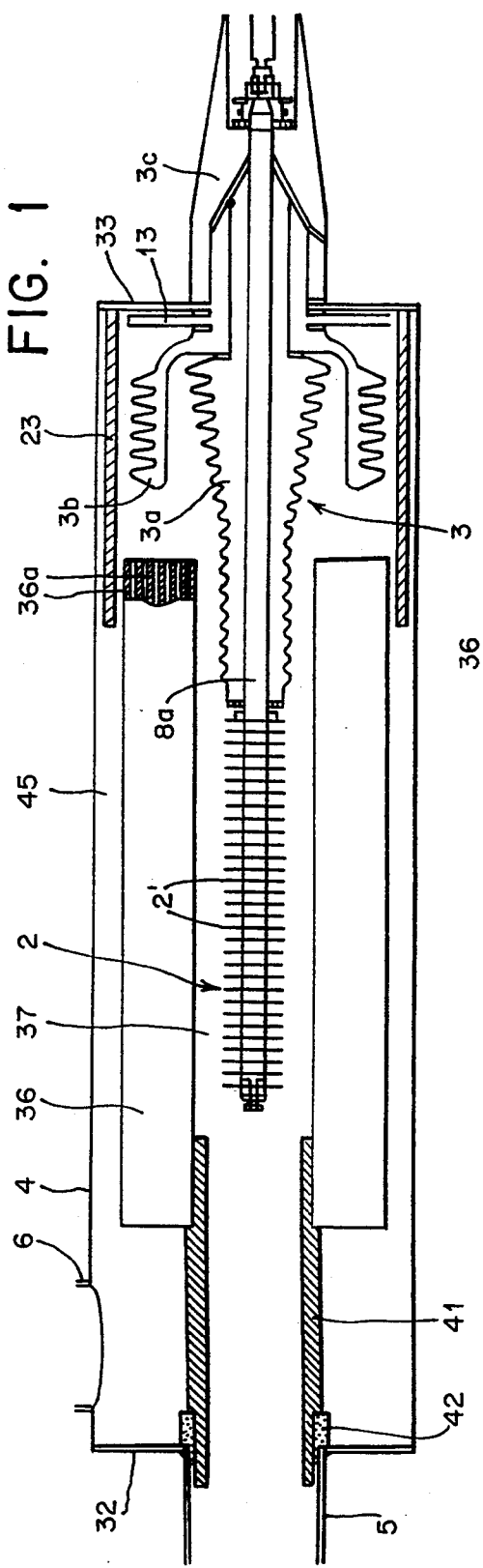

United States Patent [19]

Fleck

[11] Patent Number: 5,402,639

[45] Date of Patent: Apr. 4, 1995

[54] DEVICE FOR CLEANING EXHAUST GASES

[76] Inventor: Carl M. Fleck, 2391, Kaltenleutgeben, Austria

[21] Appl. No.: 971,863

[22] PCT Filed: Jul. 1, 1991

[86] PCT No.: PCT/AT91/00080

§ 371 Date: Dec. 29, 1992

§ 102(e) Date: Dec. 29, 1992

[87] PCT Pub. No.: WO92/00442

PCT Pub. Date: Jan. 9, 1992

[30] Foreign Application Priority Data

Jul. 2, 1990 [AT] Austria .................. 1406/90
Aug. 13, 1990 [AT] Austria .................. 1684/90

[51] Int. Cl.6 .................................... F01N 3/02
[52] U.S. Cl. ........................... 60/275; 55/466; 55/DIG. 30; 60/311; 422/180
[58] Field of Search .............. 60/274, 275, 311; 55/107, 130, 466, DIG. 30; 422/169, 180

[56] References Cited

U.S. PATENT DOCUMENTS

| | | |
|---|---|---|
| 3,440,800 | 4/1969 | Messen-Jaschin . |
| 3,979,193 | 9/1976 | Sikich .................. 60/275 |
| 4,441,971 | 4/1984 | Ishiguro ................ 60/275 |
| 4,662,911 | 5/1987 | Hirayama et al. . |
| 4,871,515 | 10/1989 | Reichle et al. . |
| 4,979,364 | 12/1990 | Fleck .................. 60/275 |
| 5,074,112 | 12/1991 | Walton ................ 60/275 |

FOREIGN PATENT DOCUMENTS

| | | |
|---|---|---|
| 0212396 | 3/1987 | European Pat. Off. . |
| 0270990 | 6/1988 | European Pat. Off. . |
| 0299197 | 1/1989 | European Pat. Off. . |
| 0332609 | 9/1989 | European Pat. Off. . |
| 2637940 | 4/1990 | France . |
| 497081 | 5/1930 | Germany . |
| 3035206 | 4/1981 | Germany . |
| 3233461 | 3/1984 | Germany .............. 60/275 |
| 3324886 | 1/1985 | Germany . |
| 3424196 | 8/1985 | Germany . |
| 3638203 | 5/1988 | Germany . |
| 3804779 | 10/1988 | Germany . |
| 3723544 | 1/1989 | Germany . |
| 3802190 | 8/1989 | Germany . |
| 3834920 | 4/1990 | Germany . |
| 411807 | 9/1932 | United Kingdom . |
| 2064361 | 6/1981 | United Kingdom . |
| 2181968 | 5/1987 | United Kingdom . |

*Primary Examiner*—Douglas Hart
*Attorney, Agent, or Firm*—Collard & Roe

[57] ABSTRACT

A device and process for cleaning exhaust gases, in particular those from diesel engines, in which the exhaust gases are taken through a channel (36a) of a ceramic body (36) where an electric field is generated substantially transversely to the direction of flow, whereby the soot particles deposited on the walls of the channel (36a) are oxidized by free ions or ions adhering to oxygen.

11 Claims, 3 Drawing Sheets

DEVICE FOR CLEANING EXHAUST GASES

The invention relates to a process for cleaning exhaust gases, especially those from diesel engines.

During the cleaning of exhaust gases from aerosols, especially soot, there is often the problem that soot particles settle down in the filter and therefore reduce its permeability, so that the soot has to be burnt off from time to time. Therefore it is necessary in common filters to supply pertinent heat quantities to the filter. This process requires temperatures within the magnitude of approx. 600° C. Concerning exhaust gases from diesel engines there is also the possibility of giving additives to the fuel which form molecular ferric oxide in the combustion chamber. This then reduces the combustion temperature of the soot below 400° C., so that the heat of the motor or the heat of the exhaust gases is sufficient to cause the settled soot to burn off. These additives, however, cause an increase in fuel consumption and the ferric oxide remains suspensible for a very long time and is very problematic with respect to environmental pollution.

From DE-A-38 34 920 a method for removing soot from exhaust gases has become known according to which the soot particles are separated in a filter body with the help of an electric field. The combustion of the soot is made by arcs whose base points are situated in the area of the soot particles. Although such a method is suitable to clean the exhaust gases, it has been seen nevertheless that for cleaning the exhaust gases of a diesel engine of usual size and type such a high electric power is required that the method does not seem to be commercially viable.

From DE-A 37 23 544 a filter for cleaning exhaust gases has become known in which the combustible particles are to be oxydized by a corona. It is provided that the particles to be separated settle down at one of the electrodes which is arranged as a particle trap. A strong corona is to be formed between the electrodes, thus generating ionized oxygen. In such a device it cannot be prevented that strong spark discharges occur, which require a high electric power in addition to causing considerable stresses to the material. Such filters are not suitable for permanent operation in motor vehicles.

Furthermore it is known from EP-A- 332 609 of the present applicant to ionize the exhaust gases first and then guide them through a channel of a ceramic body, in which channel an electric field is generated substantially transversely to the direction of flow, thereby burning off at relatively high temperatures the soot particles deposited on the walls of the channel. In some possible applications it is difficult to generate such temperatures.

Other known devices are based on the principle that soot particles are burnt off from time to time after their deposit by supplying a respective quantity of heat or that the soot particles are agglomerated by an electric field, separated in a cyclone separator and then supplied to the mixture for combustion in the cylinders of the combustion engine.

The disadvantage of known solutions is due to the fact that on the one hand considerable quantities of heat have to be produced for burning the deposited soot and that according to the second method the cyclone separator requires a considerably complex mechanical setup and considerable energy quantities during its operation.

Processes are also known in which exhaust gases are guided through a porous ceramic body which retains the particles contained therein. Such processes are described, for example, in the following specifications: DE-A 36 38 203, EP-A 212 396, EP-A 270 990, GB-A 2 064 361, U.S. Pat. No. 4,662,911. Although the removal or destruction of soot particles is provided for by various measures, such filters have an unacceptably high flow resistance. Especially in the partial load area the formation of soot deposits may occur, leading to a considerable loss in pressure. Such concepts provide honeycombs or cellular filters which consist of long adjacent filter cells which preferably have a square cross section and which are closed by stoppers that are alternatively provided on the entrance side and exit side. The exhaust gases to be filtered can pass through the porous wall which is jointly between two such filter cells, whereas the aerosols cannot pass through the pores and are thus deposited in the respective cell which is open on the entrance side. These filters are partly made from high-temperature-proof ceramic material and are preferably coated or doped with catalytic substances, so that the combustion of the separated soot particles occurs already below 600° C. in case of an excess of oxygen. As, however, such temperatures are only reached during full throttle operation, there is a considerable build-up of counterpressure in the in-between periods which reduces the motor power in an unfavourable manner. In addition, there is a permanent blockage of the pores by noncombustible metallic impurities of the soot particles, leading in the long run to an irreversible build-up of counterpressure on the exhaust gas filter. Furthermore, there is a structural exhaustion of the closing stoppers on the exit side after longer periods of operation, leading to a rising leakiness of the filter after longer periods of operation.

It is further known to clean exhaust gases by agglomerating soot particles to greater particles by using electric fields, which particles can then be separated from the exhaust gas flow by means of a mechanical separator such as a cyclone. This has already been disclosed, for example, in DE-A 34 24 196 or in WO 85/00408. Apart from the fact that such devices are relatively complex, the problem of disposing of the separated soot particles has not yet been solved in such processes. It is not acceptable for users of vehicles with diesel engines to repeatedly carry out manipulations on collecting containers within short intervals.

From DE-A 38 04 779 a device is known for removing soot particles from the exhaust gas flow of a diesel combustion engine in which a soot particle collection segment is arranged within an exhaust gas conduit. This consists substantially of a ionization segment in which an ultraviolet light source is arranged. A central electrode is arranged behind the light source, which electrode is encompassed by two concentrical electrodes, of which the inner electrode is provided with breakthroughs. The central electrode is applied to a common potential of a low-voltage and high-voltage source, of which the first is connected with the second pole of the low-voltage source and the second with the second pole of the high-voltage source. During the operation the soot particles contained in the exhaust gas flow are charged in the area of the ionization segment and are deflected in the area of the cylindrical electrodes in the direction towards the central electrode due to the field prevailing there, thereafter penetrating the inner cylindrical electrode and depositing on the innermost electrode. As soon as the deposits reach a height at which they touch the inner cylindrical electrode, they lead to a short for the low-voltage source and burn off. The disadvantage of this known device is that due to the very low potential of the inner cylindrical electrode with respect to the outer electrode the depositing of the soot particles also occurs on the outer side of said electrode, which leads to the effect that said soot particles can hardly burn off and thus are released in form of larger flakes due to mechanical influences such as vibrations and the like when a certain thickness has been reached. In order to achieve a sufficient degree of cleaning of the exhaust gases it is therefore also necessary in this device to provide a mechanical separator such as a cyclone separator, leading to an increased complexity of the arrangment and considerable need for more space.

Finally, GB-A 411,807 shows a device in which at first exhaust gas components are separated by electric fields in order to prevent the poisoning of the subsequent catalyst. The disposal of the separated exhaust gas components, however, has not been clarified yet.

It is the object of the present invention to avoid such disadvantages and to provide a device that in a simple manner allows not only separating soot particles, but also completely destroying them, and at the same time offering a long service life and extensive freedom of service.

This object is achieved by a process in which exhaust gases are taken through a channel of a ceramic body where an electric field is generated substantially transversely to the direction of flow, whereby the soot particles deposited on the walls of the channel are oxidised by free ions or ions adhering to oxygen.

It is possible that also positive ions, especially those of an AC discharge, take part in the oxidation.

The substantial aspect of the invention is the fact that an electron spray or autoionization occurs in the channel of the ceramic body. Sparks do not occur in the process in accordance with the invention per se. If, however, a spark should occur at a position, the electrical field in its vicinity drops sharply due to the high resistance of the ceramic material, so that the spark extinguishes instantly. By these measures a particularly low temperature threshold for the combustion of soot is achieved, so that a high cleaning effect is also ensured during partial load.

The existence of free electrons causes the formation of $O_2^-$ and $O^-$ radicals, which are characterized by such a reaction readiness that chemical reactions with hydrocarbons and carbon in the separated soot occur even below 150° C. with the soot burning off. It is, however, also possible that the free electrons themselves cause the activation of the soot particles and in this way favour a combustion at low temperatures. It is not absolutely necessary to provide the same amount of negative charges as soot atoms are separated.

Thus, for example, it could be possible in a passenger car that there are $10^{20}$ separated carbon atoms per second with only $10^{17}$ to $10^{18}$ electric charges if the required power is to be kept low. Therefore, a reaction initiated by a negative charge must entail a whole number of further reactions. Principally, the reaction heat alone of the first reaction is not sufficient because on the one hand the filter and on the other hand the large passing air quantity drains off the heat. Therefore, only that part of the carbon reacts which according to the Maxwell-Boltzmann distribution has sufficient kinetic energy for the reaction.

For the separated soot C in the filter there is the following differential equation at a temperature T:

$$\frac{dC}{dt} = C_0 - k[O_2^-]C[O_2] e^{-\frac{T_S-T}{T}}$$

wherein $T_S$ is the temperature at which carbon burns freely and $C_O$ is the separation rate of the soot.

Principally, the soot should burn off as quickly as it is separated. In the case of balance the soot quantity remaining in the filter comes about from the equation:

$$C = \frac{C_0}{k[O_2^-]C[O_2]} e^{\frac{T_S-T}{T}}$$

Measurements made in a 2.5 l turbodiesel have confirmed these considerations. According to these approx. 3 g soot remain in the filter after trial runs of random length at 50 W electric power for the ion formation at 250° C., approx. 2 g soot at 300° C. and approx. 1 g soot at 400° C. These quantities, however, are negligibly small.

These measures achieve a very extensive separation of the aerosols or soot. Due to the applied electric field the formation of radicals occurs and at the same time the separation of the soot, thus further promoting the combustion of the soot at low temperatures. The soot of the exhaust gas can be electrically charged before the entrance into the electrical field extending transversely to the exhaust gas flow, for example by means of spray electrodes.

In a preferred embodiment of the process the soot particles contained in the exhaust gas are negatively charged by a discharge electrode before entering into the channel of the ceramic body. This facilitates the separation in the channel of the ceramic body.

It is advantageous to select the electric voltage so high that a discharge takes place in the channel of the ceramic body by the high electric field, namely by the release of the field electrodes on the ceramic wall. This leads to the optimal operating point of the filter.

Preferably, the exhaust gases are first sent through an ionization channel and then through at least one separating channel. Thus optimal conditions can be brought about both for the ionization as well as the separation.

It is particularly favourable when both the ionization channel as well as the separating channels are arranged as channels that are open on both sides within a single ceramic body. This provides for a particularly compact design.

It may be provided that the potential difference of the electric fields is between 3 and 30 kV, preferably between 5 and 20 kV. The field strength of the electric fields in particular should be between 100 and 1000 V/mm, preferably between 200 and 500 V/mm. An optimal separation rate is achieved in this manner.

In an embodiment of the process in accordance with the invention it is possible that temporarily a catalyst is introduced into the exhaust gas flow in an air-carried form. The long-term efficiency of the filter in accordance with the invention can be considerably improved by temporarily introducing a catalyst in the exhaust gas flow in an air-carried form. In the simplest case this could be made operationally by the arrangement of a reservoir from which about every fifty operating hours of the engine and controlled by the operating time a certain quantity of catalyst is supplied in form of an aerosol. During the introduction of the catalyst the polarity of the electric field is preferably changed.

The catalyst is preferably introduced when the temperature of the exhaust gas flow is less than A° C. over a time t, whereby t is between 20 and 60 minutes and A is smaller than 500° C., preferably smaller than 300° C. A longer operating period at low temperatures may require, however, that the catalyst layer has to be renewed. By providing a temperature-dependent control it is possible to achieve optimal degrees of separation with low quantities of catalyst additive.

It is favourable if the polarity of the electrodes is temporarily switched for cleaning. It may occur that disturbing soot deposits occur on the side of the negative electrode after longer operating periods. By providing short-term positive charges it is possible to swamp it with negative particles and thus clean it.

The invention further relates to a device for cleaning exhaust gases, especially those from diesel engines, having a ceramic body with at least one channel through which the exhaust gas can flow, with electrodes for generating an electric field penetrating the ceramic body and being orientated transversely to the axis of the channel. This device is characterized in that characteristic number E, which takes into account the geometry of the cross section of the channels and the specific electric resistance of the material of the ceramic body and which is equivalent to the following relation:

$$E = \frac{\rho \cdot \beta}{d}$$

is at least $10^7 \Omega$, preferably at least $10^8 \Omega$. $\rho$ constitutes the specific electric resistance of the ceramic material at 600° C. in $\Omega$ cm, $\beta$ a geometric form factor and d the width or thickness in cm of the walls separating the channels. The geometric form factor $\beta$ is the result of the following relation:

$$\beta = \frac{l}{x}$$

wherein l is the average length of the path of the current as formed in the ceramic material between the electrodes, wherein x represents the distance between the electrodes. In arms switched in parallel with respect to the resistance of the walls which separate the channels, the total of the widths is used for d. The characteristic number E is thus the electric resistance as referred to the longitudinal dimension and the distance of the electrodes.

This leads to respectively long paths of current for the currents that arise due to the finite specific resistance of the ceramic body material, whereby such a structure is also characterized by a very good mechanical tenacity. It is further ensured that the geometric form of the cross section of the channels of the ceramic body, which is preferably arranged as a monolith, and the material parameters of the ceramic are tuned to one another, thus ensuring sufficient spray discharge and/or autoionization by adherence to the said lower threshold of the characteristic number at an electric field strength of approx. 10 kV/cm in order to guarantee a combustion of the deposited soot in the area of 200° to 500° C.

It is, however, also possible to compose the ceramic body of several parts.

In a rising characteristic number the temperature required for burning off the soot is reduced and can fall below 150° C., whereby the field strength can be reduced to 5 kV/cm in characteristic numbers of $4 \times 10^8$, thus reducing the power requirements of the filter.

The formation of the narrowest possible channels leads to very high field strengths in the channels, thus resulting in strong charge spraying and the formation of $O^-$ and $O_2^-$ ions. At the same time such a ceramic body has a high resistance, thus resulting in low power requirements of the filter.

In accordance with a further feature of the invention it may be provided that the walls arranged between rows of channels which are adjacent in the direction of the field extend in a zigzag manner, whereby the wall sections which are at a distance from one another in the direction of the field and opposite of one another and each limiting a channel are opposedly inclined to a plane or cylinder plane which is vertical to the direction of the field.

These measures lead to a further extension of the path of the current, whereby in the event that the arrangement of the cross section of the channels is made in such a way that the centres of the channels have the biggest height in the direction of the field, there is a substantially even field over the width of the channels. In order to achieve this it is only necessary to select the inclination of the walls that separate the rows of the channels with respect to a plane which is vertical to the direction of field according to the material parameters. In any case there will an evening of the field distribution over the width of the channels as compared with channels that have a rectangular cross section, so that autionization can be guaranteed over, the whole cross section. When arranging the cross section of the channels in such a way that they have the smallest height in their centre, there will a particularly strong field in this area, which however drops too strongly towards the lateral side areas of the channel. This favours the formation of charge spraying, however substantially limited to the central area of the channel.

It may further be provided that the walls of the ceramic body which determine the height as measured in the direction of the field extend sectionwise at an angle towards the direction of the field. By implementing such measures it is possible to extend the current path very substantially, thus achieving an increase of the resistance of the ceramic body. Such an increase in the resistance of the ceramic body also allows using such a filter at higher temperatures without leading to excessive power requirements by the filter. It may be provided that the walls defining the height of the channels are arranged meander-like or substantially serpentine-like.

Furthermore, it may also be provided that the walls of the ceramic body which determine the height as measured in the direction of the field extend sectionwise substantially vertical thereto, thus leading to very long current paths, especially when the rows of channels adjacent to one another in the direction of the field are offset against one another.

In accordance with a further feature of the invention it may be provided that the inner walls of the channels have a surface roughness of at least 1 $\mu$m, preferably more than 2 $\mu$m. Charge spraying is favoured by the relatively rough surfaces of the inner walls of the channels and thus improves the formation of $O_2^-$ and $O^-$ ions.

In a device for carrying out the process in accordance with the invention with a filter for separating the aerosols it may be provided in accordance with a further feature of the invention that there is an apparatus for conveying the separated soot into the zone of a discharge electrode lying at a negative potential, said electrode being provided in a chamber with air supply. In this manner it is ensured that the separated soot reaches the zone of the discharge electrode and thus comes into contact with the radicals arising there and burn off in this zone at low temperatures of, for example, 150° C.

It may also be provided that the apparatus for conveying the separated soot is formed by a movable, preferably rotatable filter made from fibrous material. This leads to a particularly simple arrangement of the apparatus.

Furthermore, it may be provided that the apparatus for conveying the separated soot is formed by a blower unit entraining the separated soot particles.

In a further apparatus for carrying out the process in accordance with the invention it may be provided that parallel to the direction of flow and also substantially towards each other there are provided high voltage electrodes which sit close to a ceramic body disposed between them, whereby said body comprises channels extending in the longitudinal direction and being open on both sides and, as seen alongside the cross section of the ceramic body, the length of the walls between two connecting points opposed from one another of walls determining the height of the channel in the direction of the electric field as built up by the high voltage electrodes with the other walls that limit the same channel is bigger than the normal distance between said connecting points as measured in the direction of the field, whereby the electric field strength is within the magnitude of 10 to 20 kV/cm at room temperature.

It is achieved by these measures that the autoionization of the passing exhaust gases occurs in the individual channels, whereby $O_2^-$ and $O^-$ radicals are formed from the oxygen contained in the exhaust gas and the soot is simultaneously separated. The separated soot is burnt by the radicals already at temperatures between approx. 100° and 300° C. In order to speed up the separation of the aerosols, especially that of the soot, the apparatus for electrostatic separation may be provided upstream with a discharge electrode which is used to charge the aerosols or the soot, respectively.

Figure 2:
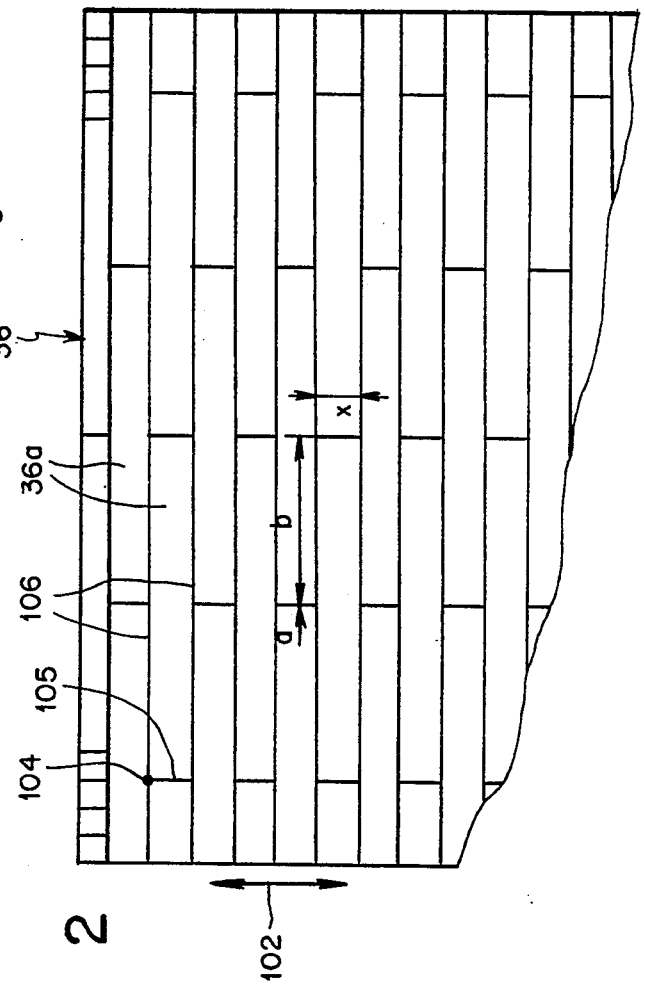
Figure 3:
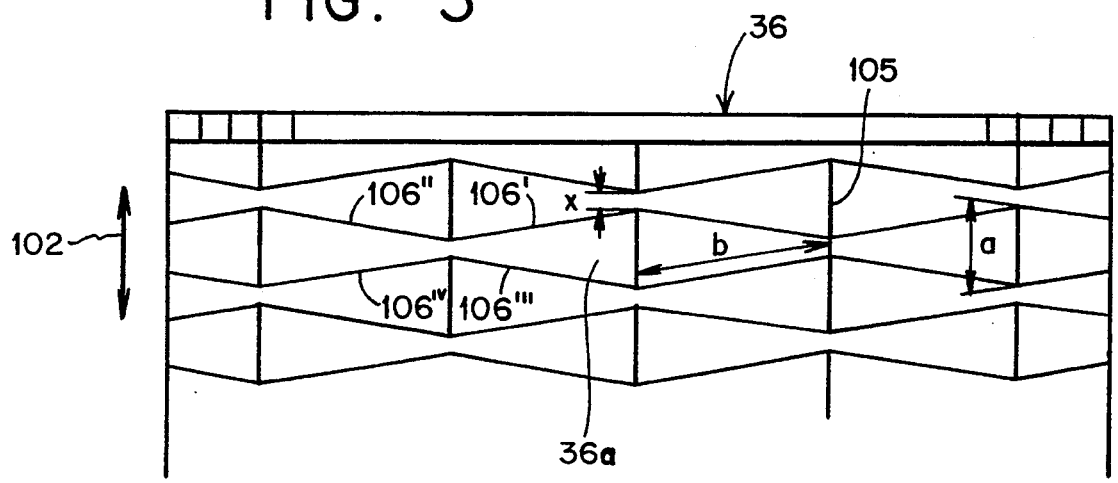
Figure 4:
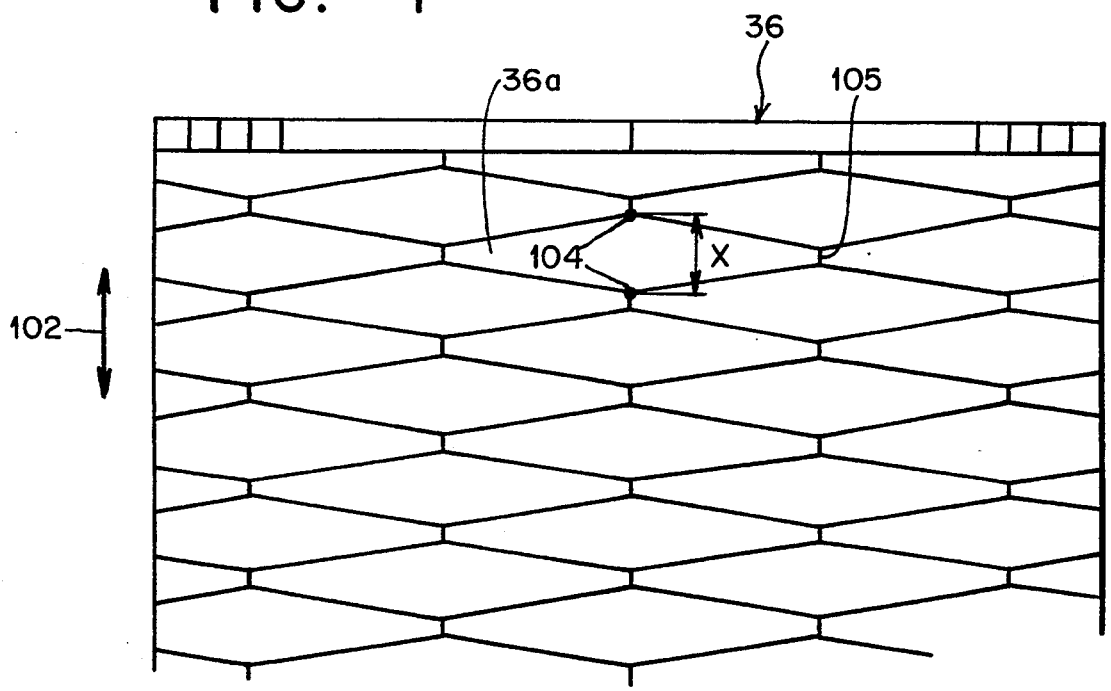

The invention is now outlined in greater detail by reference to some now preferred embodiments and will be explained in greater detail by reference to the drawings, in which:

FIG. 1 schematically shows the device in accordance with the invention;

FIG. 2 schematically shows a cross section through a device which allows the formation of radicals by means of autoionization;

FIGS. 3 and 4 show cross sections of various embodiments of ceramic bodies for the filter in accordance with the invention; and FIGS. 5a to 5d show various examples for designing the walls which determine the height of the channels.

In accordance with the embodiment of FIG. 1 the exhaust gas filter consists of a substantially cylindrical casing 4 which is closed at its ends with lids 32 and 33. A ceramic honeycomb body 36 is arranged in the interior whose cross section is annular. Said ceramic honeycomb body 36 can also be composed of several annular segments. The ionization channel 37 is arranged in the centre of the honeycomb body 36. Electrode 2 projects into the ionization channel 37 and is composed of a plurality of spray electrodes 2'.

The gas to be cleaned flows through a pipe nozzle 5 arranged in lid 32 into the filter. A ceramic tube 41 is provided in the extension of nozzle 5, which tube is sealed at its one end with a seal 42 with respect to lid 32. On the other end tube 41 is connected with ionization channel 37 of honeycomb body 36. At the end of the ionization channel 37 the exhaust gas is deflected and flows through the separation channels 36a.

Electrode 2 is held by a high-voltage insulated lead-in 3 consisting of parts 3a, 3b and 3c. The insulated lead-in 3 is used to insulate the high-voltage carrying parts from the grounded casing 4 plus lid 33. On the outer side the ceramic body 36 is provided with a thermal insulating layer 45 which, however, ensures an electric contact and is used to provide support with respect to casing 4. The cleaned exhaust gases leave the filter through an outlet nozzle 6 arranged on the circumference of casing 1.

As can be seen in FIG. 2, the ceramic body 36 comprises a honeycomb structure, wherein the rows of channels 36a adjacent to one another in the direction of the field 102 are offset from one another. The connecting points 104 of the walls 105 extending in the direction 102 of the field with the other walls 106 which limit channels 36a, which extend vertical to field 102 in the embodiment in accordance with FIG. 2, simultaneously constitute the connecting points of a current path encompassing a channel 36a. The geometric length 1 of said current path, which comes about due to the finite specific resistance of the material of ceramic body 1 and the voltage applied to the high-voltage electrodes that are not shown, is equivalent to the following relation:

$$l = 2b + x$$

The embodiment in accordance with FIG. 3 differs from that in accordance with FIG. 2 in that the walls 106', 106''; 106''', 106$^{IV}$ which separate the rows of channels 36a from one another extend in a zigzag form. The walls 106', 106''; 106''', 106$^{IV}$ of a channel 36a which are at a distance from one another in the direction of the field and oppose one another are opposedly inclined towards a plane that extends vertical to direction of field 102. In this embodiment there is a further extension of the current path as compared with the embodiment of FIG. 2, whereby form factor $\beta$ is calculated in accordance with the formula $$\beta = \frac{2 \cdot b + a}{x}$$

wherein $a > x$, and a is a dimension of wall 105 running in the direction of electric field 102.

This embodiment leads to a high field strength in the central area of the cross section of the channels 36a. The field strength, however, is very inhomogeneously distributed over the width of the channels 36a. Charge spraying occurs at relatively low field strengths in the ceramic body of 5 kV/cm, for example, in the central areas of the cross sections of the channels 36a. This leads to the formation of $O^-$ and $O_2^-$ ions, which enable the combustion of the soot attached to the filter at relatively low temperatures of 300° C. or less.

The embodiment of FIG. 4 differs from that of FIG. 3 only in that walls 105 extending in the direction of field 102 are shorter than the normal distance x of connecting points 104.

This leads to a smaller geometric form factor $\beta$ as compared with the embodiment in accordance with FIG. 3 by maintaining the same dimensions. However, there is a substantially homogeneous electric field in the interior of each channel 36a. This depends substantially on the selection of the angle that the walls 106', 106''; 106''', 106$^{IV}$ include with the plane vertical to the direction of field and the specific resistance of the material of ceramic body 36.

The embodiments of FIGS. 5a to 5d substantially aim at extending the current path by guiding in sections the walls determining the height of channels 36a at an angle to the direction of field 102.

Figure 5A:
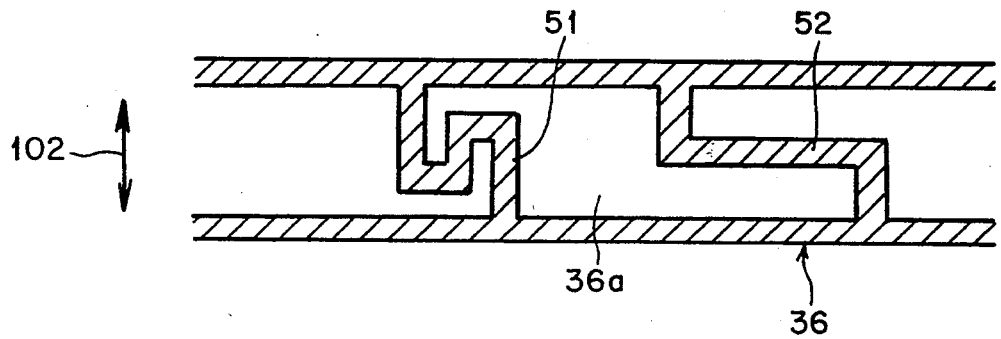

FIG. 5a shows two variations of the embodiment of walls determining the distance vertical to the direction of the field. Wall 51 extends substantially serpentine-like and thus comprises sections that extend vertical to the direction of field 102, as is clearly shown.

Wall 52, on the other hand, is offset and comprises a central section that extends vertical to the direction of field 102.

In both embodiments of walls 51, 52 the length as seen in the cross section is to be included in the calculation of the form factor.

Figure 5B:
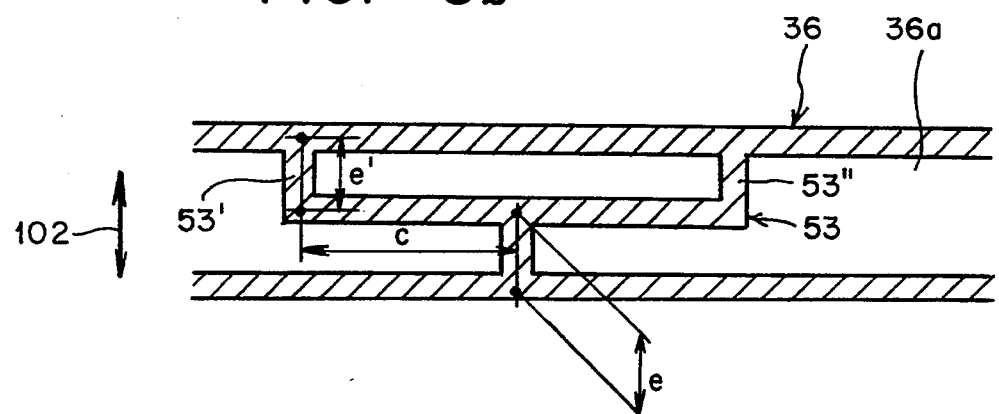

In the embodiment in accordance with FIG. 5b wall 53 is divided into two arms 53', 53'' which sectionwise extend in parallel. Length a of wall 53 to be included in the calculation of form factor $\beta$ is calculated according to the formula $$a = e + \frac{e' + c}{2}$$

This requires, however, that the various sections of wall 53 have the same thickness d and that the sections of wall 53$^{IV}$ extending on both sides of section 53''' have the same length.

Figure 5C:
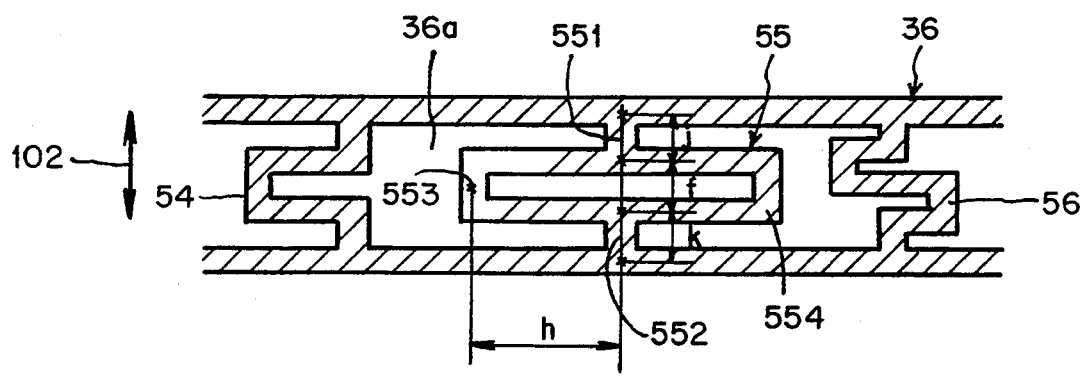

FIG. 5c also shows a wall 55 which is split up sectionwise in parallel branches 553, 554. Two further sections 551, 552 are connected in parallel to said section.

In such a wall 55 the formula for the length a to be used for form factor $\beta$ is calculated as follows:

$$a = j + k + \frac{f + 2 \cdot h}{2}$$

This requires, however, that the walls have the same thickness d and that wall parts 551, 552 are symmetrical to walls parts 553, 555. Otherwise, the reciprocal values of the lengths arising between connecting points of the wall parts 551, 552 with the wall parts 553, 555 on both parts would have to be added. From this value the substitute length for the section lying between the wall parts 551, 552, similar to the determination of a substitute resistance of resistors switched in parallel, would have to be calculated. The lengths j and k for determining the overall length a of the current path would have to be added to said value.

In the walls 54 and 56 extending substantially serpentine-like it is necessary like in walls 52 and 51 in accordance with FIG. 5a to use the median length of said walls in the calculation of the form factor $\beta$.

Figure 5D:
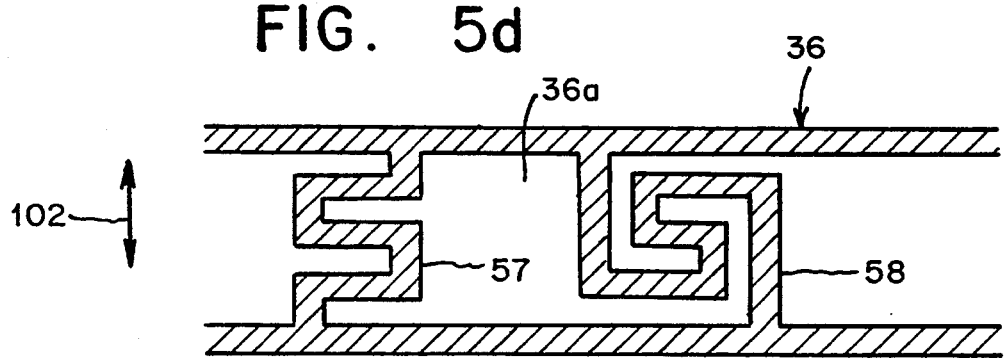

The same also applies with respect to walls 57 and 58 in accordance with FIG. 5d, whereby the latter wall extends meander-like.

In order to achieve sufficient autoionization or a charge spraying in the interior of the channels, the resistance of the current paths formed in the ceramic body 36 is of importance.

In order to ensure a substantial separation and combustion of soot particles from the exhaust gas flow at sufficiently low energy requirements, it is substantial that the characteristic number E arising from the following formula $$E = \frac{\rho \cdot \beta}{d}$$

is at least $10^7$, preferably at least $10^8$, whereby $\rho$ means the specific electric resistance of the ceramic material at 600° C. in cm, $\beta$ a geometric form factor and d the width or thickness of the walls separating the channels (36a) in cm, and the geometric form factor $\beta$ arising from the following relation:

$$\beta = \frac{1}{x}$$

wherein l means the length of the current path forming due to the voltage applied to the high voltage electrodes and the finite specific resistance of the ceramic material between two opposed connecting points 104, 104' of the walls of a channel 36a determining the height of the channels in the direction of the field with the other walls 106 limiting the same channel and extending preferably substantially vertical to the direction of the field, wherein in walls 53, 55 which are divided sectionwise into several arms 53, 53', 553 554 said arms, which with respect to resistance represent a connection in parallel, are to be taken into account according to their resistances and which are to be inserted with the length of the remainder of the wall equivalent to the substitute resistance of said arms, and wherein x means the normal distance of said connecting points 104' as measured in the direction of the field.

I claim:

1. A device for cleaning exhaust gases comprising a ceramic body having rows of walls extending in the direction of a longitudinal axis, opposing ones of the walls and additional longitudinally extending walls defining channels through which the exhaust gases can flow, and electrodes for generating an electric field penetrating the ceramic body and passing through the channels, the electrodes being orientated longitudinally to the longitudinal direction of the channels, the field strength of the electric field in the channels being between 100 and 1000 V/mm, and a characteristic number E, which takes into account the geometry of the cross section of the channels and the specific electric resistance of the material of the ceramic body and which is equivalent to the following relation $$E = \frac{\rho \cdot \beta}{d}$$

being at least $10^7 \Omega$, wherein $\rho$ constitutes the specific electric resistance of the ceramic material at 600° C. in $\Omega$ cm, $\beta$ constitutes a geometric form factor and d is the width or thickness of the walls separating the channels, the geometric form factor $\beta$ being a result of the following relation:

$$\beta = \frac{1}{x}$$

wherein 1 is the average length of the current path formed in the ceramic material between the electrodes and x is the distance between the electrodes measured in the direction of the electric field.

2. The device of claim 1, wherein the electric field is between 200 and 500 V/mm.

3. The device of claim 1, wherein E is at least $10^8$ Ω.

4. The device of claim 1 and adapted to separate soot particles from diesel exhaust gases, wherein the electrodes are high-voltage electrodes arranged parallel to and facing each other, and the additional walls are inclined with respect to the opposing walls in opposite directions and are connected to each other at points of connection, whereby the additional walls extend zig-zag-like in a direction extending transversely to the longitudinal axis, the channels being open at their ends, and the distance between opposing ones of the points of connection determining a maximum height of the channels in the direction of the electric field, whereby the electric field strength is within a magnitude of 10 to 20 kV/cm at room temperature.

5. The device of claim 1, wherein the additional ceramic body walls define the height of the channels, as measured in the direction of the electric field, and the additional walls extend sectionwise at an angle to the electric field direction.

6. The device of claim 1, wherein the additional ceramic body walls defined the height of the channels, as measured in the direction of the electric field, the additional walls extending meander-like.

7. The device of claim 1, wherein the ceramic body is a cylinder extending about an axis parallel to the longitudinal axis of the channels, the ceramic body cylinder defining an ionization chamber along the cylinder axis wherein the electrodes are arranged, and the channels being arranged around the ionization chamber.

8. The device of claim 1, further comprising a catalyst coating on the ceramic body walls for enhancing the oxidation of hydrocarbons.

9. The device of claim 1, wherein the ceramic body consists of at least two plates arranged transversely to the direction of the electric field, the channels being defined between the plates.

10. A device for removing soot particles from exhaust gases of an internal combustion engine, which comprises
   (a) a ceramic body defining an ionization chamber for generating negative ions and arranged to receive the exhaust gases and to permit the exhaust gases to flow therethrough,
      (1) the ceramic body having walls defining separation channels disposed substantially parallel to the ionization chamber,
   (b) electrode means projecting into the ionization chamber and arranged to generate at least one electric field extending transversely to the direction of flow of the exhaust gases, and
   (c) means for deflecting the flow of the exhaust gases as they flow out of the ionization chamber and reversing the direction of flow to direct the exhaust gases into the separation channels, the soot particles being deposited on the walls of the separation channels and being burned off by the electric field.

11. The device of claim 1 and adapted to separate soot particles from diesel exhaust gases, wherein the electrodes are high-voltage electrodes arranged parallel to and facing each other, and the additional walls are inclined with respect to the opposing walls in opposite directions and are connected to each other at points of connection, whereby the additional walls extend zig-zag-like in a direction extending transversely to the longitudinal axis, the channels being open at their ends, and the distance between opposing ones of the points of connection determining a minimum height of the channels in the direction of the electric field, whereby the electric field strength is within a magnitude of 10 to 20 kV/cm at room temperature.

* * * * *